United States Patent Office 3,088,533
Patented May 7, 1963

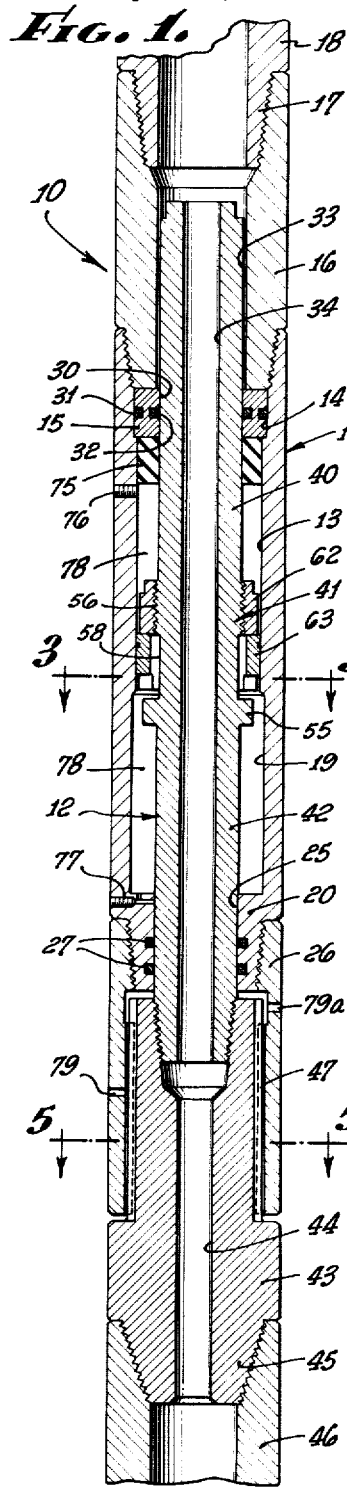

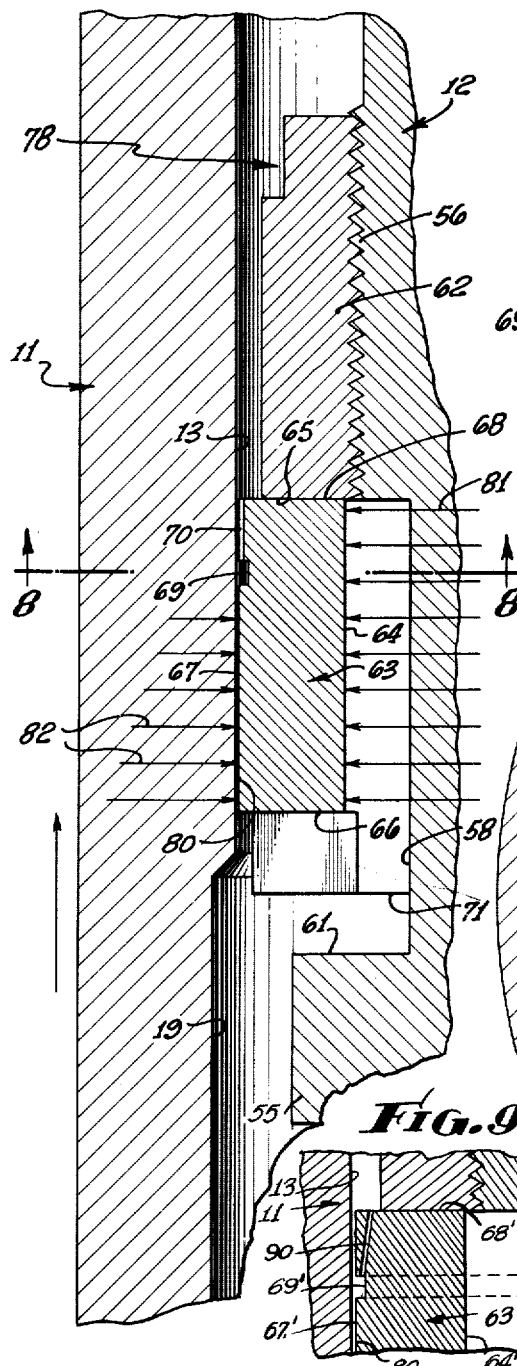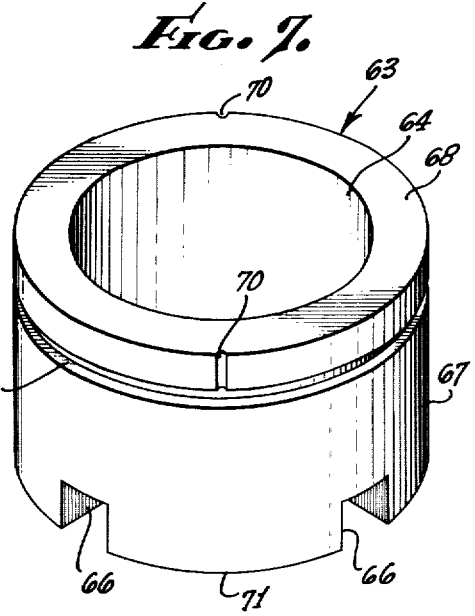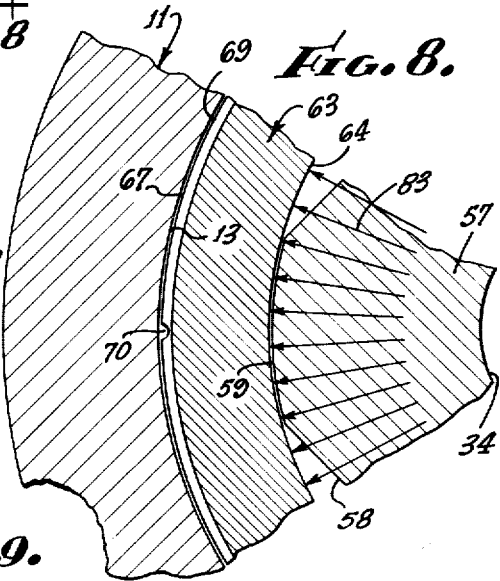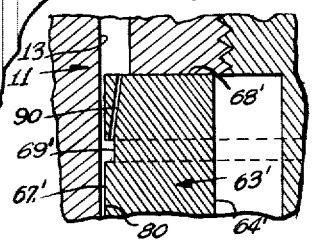
Wayne N. Sutliff
INVENTOR.

3,088,533
SLEEVE VALVE AND OIL WELL TOOL
EMBODYING THE SAME
Wayne N. Sutliff, 2901 Glenwood Circle,
Bakersfield, Calif.
Filed Apr. 27, 1959, Ser. No. 809,153
9 Claims. (Cl. 175—297)

This invention relates to sleeve valves operating under exceedingly high pressures and has particular utility in oil well tools having inner and outer mandrels, the relative telescopic travel of which in a given direction is retarded by a sleeve valve, while allowing comparative free telescopic travel between said mandrels in the opposite direction.

U.S. Patent No. 2,645,459 issued to me on July 14, 1953, disclosed a hydraulic jar embodying a sleeve valve of the class above referred to, the broad utility of which is evident from the fact that U.S. Patent 2,703,696, issued March 8, 1955, to B. A. Deters and M. O. Johnston on an oil well testing tool embodies a sleeve valve patterned after that disclosed in my patent, and the fact that both of these patented tools have gone into extensive use in the oil industry.

In each of these patented tools, the sleeve valve is slidable axially a short distance on the inner mandrel between a stop at one end thereof and an annular shoulder having a ground seat at the other end of said valve. When the valve is shifted against the stop, which takes place whenever telescopic movement in a certain given direction between the mandrels occurs, the valve separates from said seat and liquid freely by-passes the valve, flowing inwardly between the seat and the valve and axially through channels provided between the valve and the inner mandrel.

The valve makes a loose sliding fit in a retarding bore provided in the outer mandrel, however, so that when telescopic movement in the opposite direction is attempted with the valve in that bore, friction between said bore and the valve shifts the latter against said seat, thus closing the valve. Further telescopic movement in said opposite direction is now retarded by the rate at which liquid forced against the closed valve can escape between the valve and said bore.

In said patented oil well tools, liquid pressures of many thousands of pounds p.s.i. are imposed on this sleeve valve during this retarding action. This liquid has access to the spaces between the sleeve valve and the inner mandrel which has been found to result in expansion of a portion of the sleeve of the valve adjacent the ground seat. A progressive increase thus occurs in the retarding action which the valve is designed and built to offer, with each successive operation performed with the tool. Eventually, the time period for the retarded telescopic action becomes insufferably long, and the tool must be disassembled and the sleeve valve ground down to its original outside diameter.

Returned to service, however, the tool is subject to a repetition of a progressive slowing up in its retarded telescopic action, until soon it must be again reconditioned.

It is an object of the present invention to provide a sleeve valve of the same general type as the sleeve valves shown in said patents and which will perform its retarding function satisfactorily and uniformly, and not be subject to the disorder above pointed out.

In oil well tools employing inner and outer telescopic mandrels and a sleeve valve as generally outlined above, a body of operating liquid (generally a light oil) is confined in a chamber inside said retarding bore, the escape of said liquid being prevented by suitable seals located at opposite ends of the chamber. In such tools it is necessary to provide a means for transmitting rotary motion from one of the mandrels to the other and this is accomplished by interlocking splines which are slidably related axially to each other so as not to interfere with the telescopic relationship between the two mandrels. Heretofore it has been universal practice to provide these splines on the two mandrels within said operating chamber so that the splines are lubricated by said operating liquid.

Fragments of metal are chipped from these splines and these fragments in the operating oil are admitted between surfaces of the valve and occasionally interfere with its proper performance.

It is another object of the invention to provide an oil well tool of the general type above referred to, having means for transmitting rotary motion from one mandrel to the other without the production of metal chips in the operating liquid chamber.

By virtue of the location of the splines in the liquid chamber in prior practice, torque was transmitted between the outer mandrel and a portion of the inner mandrel of relatively small diameter which was connected by threads of correspondingly small diameter to the sub connected by the tool to a drill string. The capacity of such small-diameter threads to transmit torque, particularly in a reverse direction to the pitch of the threads, is relatively limited. This factor restricted rotary operations, where such a tool was included in the drill string, to those which would not unscrew the small-diameter threads of the tool through which torque must be transmitted.

It is a further object of the invention to provide an oil well tool of the general type mentioned having splined torque transmitting means which is not limited in capacity by transmitting said torque through small diameter threads.

Another difficulty experienced in the use of oil well tools of the general type above described results from what is termed "spudding" the tool when inserting this into a well which means the dropping of the tool with the drill string as the tool approaches the bottom of the well so that the tool is collapsed telescopically at a very high rate of speed and under terrific pressure. This relative movement between the inner and outer mandrels of the tool takes place in the direction in which the sleeve valve offers relatively slight resistance to such action, nevertheless this movement is so sudden and with such force that the passages provided between the inner mandrel and the valve are inadequate to allow a flow of liquid past the valve at a high enough rate to prevent the development of a considerable liquid pressure in one end of the operating liquid chamber adjacent one of the seals for confining liquid in said chamber. This spudding action sometimes results in damage to the seal at that end of the chamber or even expansion of the metal of the outer mandrel.

It is another object of the present invention to provide an oil well tool of the general type above referred to in which provision is made for cushioning the shock produced by spudding of the tool and thus prevent damage being done to the tool.

The manner of accomplishing the foregoing objects as well as further objects and advantages will be made manifest in the following description taken in connection with the accompanying drawings in which:

FIG. 1 is a diagrammatic longitudinal vertical sectional view taken through a preferred embodiment of the oil well tool of the invention and showing this tool with the inner and outer mandrels thereof in almost completely collapsed telescopic relation.

FIG. 2 is a view similar to FIG. 1 showing the same tool with the inner and outer mandrels thereof in completely extended telescopic relation.

FIG. 3 is an enlarged horizontal sectional view taken on the line 3—3 of FIG. 1 and illustrating the passages provided to extend axially between the sleeve valve and the inner mandrel.

FIG. 4 is a vertical sectional view of a short section of the sleeve valve of the invention taken on the line 4—4 of FIG. 3 and shows in elevation the middle section of the inner mandrel on which the sleeve valve is mounted.

FIG. 5 is an enlarged horizontal sectional view taken on the line 5—5 of FIG. 1 and illustrates the external spline by which the inner and outer mandrels are non-rotatably related.

FIG. 6 is a greatly enlarged detailed vertical sectional view of the sleeve valve of the invention, with the latter positioned approximately as shown in FIG. 1, during relative telescopic movement between the outer and inner mandrels of the tool, which movement is being substantially retarded hydraulically by said valve.

FIG. 7 is a perspective view of a preferred embodiment of the sleeve valve of the invention.

FIG. 8 is a fragmentary horizontal sectional view taken on the line 8—8 of FIG. 6 and illustrating an end portion of said valve expanded by the unbalanced internal liquid pressure thereagainst into tight engagement with the retarding bore of the outer mandrel of the tool of the invention.

FIG. 9 is a diagrammatic fragmentary sectional view of a modified form of the sleeve valve of the invention.

Referring specifically to the drawings, the invention is there illustrated as embodied in a hydraulic jar 10 which includes an outer mandrel 11 and an inner mandrel 12 which are telescopically related.

The outer mandrel 11 is in the general form of a tubular cylinder having a bore 13 the upper end of which has a counterbore 14 for receiving a seal ring 15 and the upper portion of this counterbore is internally threaded to connect with a sub 16 which has internal threads at its upper end for screwing onto a pin 17 provided on the lower end of a drill string 18.

The bore 13 also has a lower counterbore 19 which terminates at its lower end with an internal shoulder 20 having a bore 25 and being externally threaded to screw into an outer spline sub 26. The bore 25 is provided with suitable annular grooves for receiving O-rings 27 the purpose of which will be made clear hereinafter.

The outer spline sub 26 has a series of splines 28 formed vertically about the inner surface thereof, these splines being separated by grooves 29.

The seal ring 15 has an internal bore 30 which has the same diameter as bore 25 and is internally and externally grooved to receive O-rings 31 and 32, the purpose of which will be made clear hereinafter. The top sub 16 has an internal bore 33 which is of the same or slightly larger diameter than the bores 25 and 30.

Inner mandrel 12 has a cylindrical axial passage 34 which extends throughout its length and this mandrel includes three integral sections, to wit: upper section 40, middle section 41 and lower section 42. Sections 40 and 42 are of the same outside diameter and are slidably received respectively by bores 30 and 25. The lower end of section 42 is externally threaded and screws into suitable threads provided in the upper end of a bottom spline sub 43. This sub has an internal passage 44 of equal or greater diameter to that of passage 34 in the inner mandrel 12 and has a threaded pin 45 which screws into the upper box end of a sub 46 on which a fishing tool or any other oil well tool may be suspended. The bottom spline sub 43 has external male splines 47 and spline grooves 48 which mesh with the internal splines 28 and grooves 29 of the outer spline sub 26.

The middle section 41 of inner mandrel 12 is shaped to provide at its lower end an annular radially extending stop 55, which also acts as an anvil in the operation of the jar 10. An upper portion of the middle section 41 has external threads 56 and the central portion 57 between the threads 56 and the stop 55 has four flat faces 58 and four segmental cylindrical faces 59 and four segmental cylindrical grooves 60 at the lower ends of faces 59 which are formed contiguous with the upper face 61 of stop 55. The upper ends of flat faces 58 terminate in the same horizontal planes with the upper ends of faces 59 and the latter have a common radius which causes these to produce shoulders which extend out beyond the base of the threads 56 and thus form stops for a ring 62 which is screwed onto the threads 56 to make a tight engagement with the upper end of the central portion 57 of the middle section 41 of the inner mandrel 12.

Before the ring 62 is thus screwed on the threads 56 a sleeve valve 63 is slipped over the upper section 40 of the inner mandrel 12 and over the threads 56 and onto the central portion 57 of the middle section of the inner mandrel. The valve 63 is in the form of a cylindrical tubular sleeve having an inner bore 64 which is only slightly larger than the outside diameter of the segmental cylindrical faces 59 so that the valve 63 is rotatable and vertically slidable on the faces 59 within the vertical limits offered by the stop 55 and the ring 62. The ring 62 forms an annular radial shoulder and has an annular seat 65 ground on its lower end which seat lies in a true radial plane when the ring 62 is installed, as above noted.

Formed upwardly in the lower end of valve 63 are four relatively large notches 66 the purpose of which will be made clear hereinafter. The outer periphery 67 of the valve 63 is cylindrical and makes a fairly loose sliding fit within the bore 13 when the valve 63 is disposed within this bore. While the degree of looseness of this fit may vary it is preferable to have the outside diameter of the peripheral surface 67 of the valve 63 be two-thousandths of an inch less than the inside diameter of the bore 13. The upper end of the valve 63 is provided with a true radial ground face 68 which makes a liquid-tight engagement with the ground seat 65 on the ring 62 when the valve 63 is shifted upwardly against that seat as shown in FIGS. 1, 4 and 6. Formed in what will be referred to as an "interior" portion of the peripheral surface 67 of the valve 63 is an annular groove 69 which is connected with the upper end of the valve 63 by one or more shallow axial grooves 70. Two such grooves are shown in the drawings as this number has been found entirely adequate for the purposes of the invention. The sleeve valve 63 has a lower end face 71.

When assembling the hydraulic jar 10 a cushion 75 comprising a ring of rubber or like material which is impregnated with air bubbles is inserted in the bore 13 just beneath the seal ring 15 and is of the proper size to just fit the bore and the outer surface of the inner mandrel 12. This ring 75 is preferably made of the material commonly known as "Unicell" which is rubber impregnated with air cells which are individually separate from each other so as to provide a spongy mass which is compressible in much the same manner as a body of air confined in a similar space is compressible.

Just below the lower end of the cushion 75, the wall of the outer mandrel 11 is provided with a threaded hole for receiving an air vent plug 76 and a similar hole is provided for a filling plug 77 in the shoulder 20, which plugs are provided for the purpose of filling the annular chamber 78 formed within the bore 13 and counterbore 19 between the seals 15 and 27, with an operating liquid which is preferably a light lubricating oil. This operating liquid is retained in chamber 78 by the seal formed by O-rings 27 at the lower end of the chamber and by the seals formed by O-rings 31 and 32 at the upper end of the chamber 78.

The outer spline sub 26 is provided with liquid circulating holes 79 and 79a to allow external well fluid to circulate between the outer spline sub 26 and the inner spline sub 43 to lubricate the splines in their sliding action during relative telescopic movement between the outer mandrel 11 and the inner mandrel 12.

Operation

In preparing the hydraulic jar 10 of the invention for use, the plugs 76 and 77 are removed, the chamber 78 filled with a light lubricating oil and the plugs 76 and 77 are then replaced. The jar 10 is then screwed onto the lower end of a section of drill string 18 and a sub 46 screwed onto the lower end of the jar, this sub being connected with a fishing tool or any other tool which it is desired to extend into the well and which may require a jarring operation incidental to its operation in the well, for the purpose of assuring its withdrawal.

The chamber 78 is usually filled with oil while the outer and inner mandrels 11 and 12 are telescopically related as shown in FIG. 2. In this relative position of the mandrels, the middle section 41 of the inner mandrel is disposed in the lower portion of liquid chamber 78 within the confines of the counterbore 19. This counterbore having a substantially larger inner diameter than the peripheral surface 67 of the sleeve valve 63, there is very slight resistance to axial movement of the inner mandrel 12 within the outer mandrel 11 while the middle section 41 of the inner mandrel is located within counterbore 19.

The outer and inner spline subs 26 and 43 are in relatively extended relation, with the inner and outer mandrels telescopically related as shown in FIG. 2, but the splines thereof are still in mesh so that rotary motion may always be transmitted from the drill string 18 through the outer mandrel 11 to inner spline sub 43, and through the latter to the sub 46 suspended on the lower end of said inner spline sub.

When the inner mandrel 12 becomes supported from below as by the sub 46 and the elements suspended therefrom coming to rest on the bottom of the well, a continued downward movement of the drill string 18 produces a telescopic motion between the outer and inner mandrels terminating with the outer and inner spline subs 26 and 43 being completely telescoped and in the middle section 41 of the inner mandrel 12 being elevated relatively in the liquid chamber 78 until the sleeve valve 63 is entirely confined within the bore 13 with the valve 63 resting with its lower end face 71 on the face 61 of the anvil stop ring 55.

While this relative movement is taking place, a free passage for liquid is provided between the lower end of the valve 63 and the ring 55 through the notches 66 and axially from these notches through the free spaces formed by the flat faces 58 of the central portion 57 of the inner mandrel 12 and then outwardly between the upper end of the valve 63 and the ground annular seal 65 by virtue of the fact that the upper end of the valve 63 is now lowered into spaced relation with this ground seal as shown in FIG. 2. Thus, while the valve 63 makes a close sliding fit externally with the bore 13 as it enters this bore, operating fluid may freely flow downwardly by-passing the valve to equalize the liquid pressures existing in the portion of the chamber 78 at the upper end of the valve 63 and the portion of said chamber at the lower end of said valve.

There is thus relatively little liquid resistance to the telescopic movement between the outer and inner mandrels in which the outer mandrel moves downwardly relative to the inner mandrel and which results in the valve 63 entering the bore 13.

FIG. 1 shows the outer mandrel 11 lifted a slight distance from its lowermost telescopic relation with the inner mnadrel 12. During this slight upward movement of the outer mandrel, the friction between it and the sleeve valve 63 causes the latter to be lifted from its lowermost position on the inner mandrel, in which it is shown in FIG. 2, to its uppermost position on said mandrel as it is shown in FIGS. 1, 4 and 6 in which the upper ground face 68 of the sleeve valve comes into contact with the annular ground seat 65 on the annular shoulder 62 of the inner mandrel and closes the valve 63 against any further outflow of liquid between the seat 65 and upper valve face 68. This traps the operating liquid in the lower portion of the chamber 78 between the chamber seal 27 and the valve 63 so that further upward movement of the outer mandrel, while the inner mandrel is held stationary, is only possible by an escape of liquid from the portion of the chamber below the valve to the portion of the chamber above the valve and the only passage available for this escape is the by-pass passage 80 comprising the very minute annular space between the peripheral surface 67 of the valve 63 and the bore 13.

The reason why the by-pass passage 80 is made so small is that it is desired to subject the drill string 18 to a powerful upward strain by lifting on this with the derrick rigging from which the drill string is suspended until an upward pressure of as much as one hundred tons is placed on the drill string. A substantial part of this of course is applied in lifting the dead weight of the drill string but possibly as much as half of it is applied in stretching the drill string so that when this tremendous upward force applied to the outer mandrel 11 gradually causes a seepage of liquid from the portion of the chamber 78 confined by the counterbore 19 into the portion of said chamber confined by the bore 13 so that the point of connection between said bore and counterbore is lifted above the upper end of the sleeve valve 63, and a relatively free passage thus set up between the lower and upper portions of chamber 78, the outer mandrel 11 will thereupon be jumped upwardly with terrific acceleration and force until the hammer shoulder 20 of the jar 10 strikes the anvil shoulder 55 a dynamic blow.

The conclusion of the jarring action just described finds the parts of the jar positioned as shown in FIG. 2. To repeat the jarring action just described in case the first operation of the jar did not loosen the sub 46 and the elements connected thereto (which are presumably stuck in the well), the drill string 18 is merely lowered to return the outer mandrel 11 to completely collapsed relation with the inner mandrel 12 after which upward tension is placed on the drill string in the same manner as above described to accomplish another jarring action.

The annular passageway 80 between the valve 63 and bore 13 which is actually used in the invention and which, as above noted, represents only about one-thousandth of an inch difference between their respective radii, is of course greatly exaggerated in FIG. 6 which is a diagrammatic representation of the valve 63. The by-pass passageway 80 is coextensive with the annular peripheral surface 67 of the sleeve valve 63 which lies between the upper ends of notches 66 and the upper radial ground face 68 of the valve 63. In the present invention, of course, the effective portion of the by-pass passage 80 is only that between the uppermost portions of notches 66 and the annular groove 69 because when fluid being forced through the by-pass passageway 80 reaches the annular groove 69 the pressure of this fluid drops to where it no longer offers substantial resistance to its flow and it flows readily from the groove 69 through the axial grooves 70 into the upper portion of the chamber 78 disposed above the valve 63 in which the liquid pressure is at this time relatively low.

The significance of the annular channel 69 and the axial channels 70 in the peripheral face 67 of the sleeve 63 will now be explained. The tremendous high liquid pressures applied to the inner face 64 of the sleeve valve 63 during the building up of tension by lifting on the drill string 18 in the first part of a jarring action is illustrated in FIG. 6 by force vectors 81. It is noted that these are all of equal length as the liquid pressure applied to the sleeve 63 from the inside is applied equally to all points in the surface 64. This pressure amounts to several thousand pounds to the square inch and its aggregate amount is enough to expand the sleeve valve 63 wherever this internal pressure is not balanced.

The liquid pressure applied to the face 64 of valve 63 is also applied to the by-pass passage 80 causing liquid to flow upwardly between the valve and the bore 13. Vectors 82 are shown in FIG. 6 representing the liquid pressures thus applied inwardly against the peripheral face 67 of the sleeve valve 63 and it will be noted that as the liquid travels upwardly through annular by-pass passage 80, the pressure of this liquid drops thereby decreasing the pressure applied inwardly against the peripheral valve surface 67 toward the upper end of valve 63. This decrease in counterbalancing effect of the liquid by-passing valve 63 through the peripheral passage 80 results in an unbalanced internal pressure being applied against the upper portion of the bore 64 of the valve 63 tending to cause the upper end portion of this valve to be belled outwardly as previously pointed out.

This outward belling of the uppermost portion of the valve 63 brings the upper portion of the peripheral surface 67 of said valve in face-to-face contact with the bore 13. In hydraulic valves of this general type employed in the prior art this belling of the upper end of the valve narrowed the upper portion of the peripheral by-pass passage 80 between the valve 63 and the bore 13 and increased the time period required for a jarring action. Each time a jarring action took place the outward expansion of the upper portion of the sleeve valve would leave this expanded upper portion with an outward set which in the next jarring action would be increased until before long the upper portion of the peripheral by-pass passage 80 would be substantially reduced in size so as to render it necessary to remove the jar from the well and a grinding or a lathe operation performed on the peripheral surface of the valve to return this to its original uniform outside diameter.

The valve 63 in the present invention is likewise subject to an outward belling of the uppermost portion thereof until the peripheral surface of the valve lying between the annular groove 69 and the upper ground face 68 of the valve comes into direct contact with the bore 13 of the outer mandrel 11. This expansion of the upper portion of the valve 63 is illustrated in FIG. 8 as resulting from the unbalanced application of extremely high hydraulic pressure to this portion of the bore of the valve as indicated by vectors 83. In this action, the surface 67 is expanded into close contact with the bore 13 of the outer mandrel 11 so as to shut off all flow of liquid passing vertically through this area excepting the escape afforded by the axial channels 70. Owing to the fairly high pressure which the liquid is under even when it escapes from the passage 80 into the channel 69, the relatively small grooves 70 are adequate to permit flow of this liquid upwardly into the low pressure area in the upper portion of the chamber 78.

It will be noted that one effect of providing the annular groove 69 and axial grooves 70 in the peripheral surface 67 of the valve 63 is to cause almost a complete reduction in the counterbalancing pressure applied inwardly against the upper portion of the peripheral surface 67 located between the annular groove 69 and the upper ground face 68 of the valve. In the present invention, therefore, this upper portion of the sleeve valve 63 is belled out into close contact with the bore 13 and rides on this bore throughout the portion of each jarring operation in which the valve 63 is confined within the bore 13. In view of the tremendous force available to cause relative movement between the two mandrels of the jar, the friction set up by this contact of the upper portion of the valve with the bore 13 is of no moment and it does not interfere in any way with the normal and uniform operation of the jar as designed.

It might be thought that the lowering of pressure by the provision of channel 69 and groove 70 would cause a reduction of counterbalancing pressure just below the channel 69 to a degree that would cause this portion of the valve 63 to also be belled outwardly by the unbalanced internal pressure operating in this zone. This however does not take place as the contact of the upper portion of the valve between the upper face 68 and the channel 69 with the bore 13 acts as one end of a bridge which cooperates with the high balancing liquid pressures applied inwardly against lower portions of the peripheral surface 67 to prevent the outward belling of the upper portion of valve 63 to extend below annular groove 69. Thus, it has been found in actual operation that the provision of the liquid escape means such as offered by the annular channel 69 and grooves 70 for the escape of liquid upwardly from an interior area of the peripheral surface 67 to the upper end of the valve 63, causes this valve to allow a flow of liquid through the passageway 80 at a normal rate through a large number of successive operations of the jar 10 notwithstanding the fact that the upper end of valve 63 is belled outwardly into close contact with the bore 13 during the first few operations of the jar.

While the provision of an annular channel 69 and connecting grooves 70 leading upwardly therefrom to the upper end of the valve 63 is a preferable and workmanlike arrangement for providing an escape passage means to by-pass liquid past the outwardly belled upper portion of the valve 63, such an escape passage means might be provided much more simply and be equally effective. Thus, when the present invention was initially discovered, this escape passage means comprised merely a plurality of shallow axial grooves filed in the upper portion of the peripheral surface 67 of the valve reaching from the face 68 at the upper end of the valve downwardly into an interior portion of surface 67 located at about the level occupied by the annular groove 69 in the drawings. These grooves thus passed through the upper hand of surface 67 surrounding the upper portion of the valve that is expanded outwardly into contact with the bore 13 and allowed the fluid flowing upwardly through the peripheral passageway 80 to continue flowing upwardly by escaping through these axial grooves.

While surface channels and grooves are shown in this liquid by-pass means in the preferred embodiment illustrated, it is to be understood of course that a similar liquid escape means might be provided in a modified valve 63' (FIG. 9) by one or more holes 90 drilled downwardly from the upper end face 68' of the valve 63' in an area not covered by contact of the valve with the ground seat 65 and connecting at its lower end with the peripheral surface 67' of the valve 63' in an interior area approximately as indicated by the location of the annular channel 69' in valve 63'.

The modified form of the valve 63' of the invention shown in FIG. 9 is like the valve sleeve 63 excepting for its lacking any grooves 70 and having substituted for these, one or more of the holes 90. Elements in sleeve 63' corresponding to like elements in sleeve 63 are identified herein by the use of corresponding reference numerals with prime attached.

The term "interior area" used herein and in the claims, means an area of the cylindrical peripheral surface 67 of the valve 63 located a sufficient distance below the upper end of surface 67 so that the flow of liquid through annular passage 80 is substantially unimpeded in this area by the expansion of the upper extremity of the sleeve valve 63, provided that special passage means of ample cross-sectional area, first provided by the present invention, are formed in the valve to connect passage 80 at a point or points within that interior area, to the low pressure liquid chamber above sleeve valve 63.

Dependence is placed in the present invention upon the annular passage 80 located between valve 63 and bore 13 as the regulating, restricted liquid discharge passage during the tensioning cycle of the tool embodying the invention.

Provision of special passage means such as the annular channel 69 and one or more grooves 70 or holes 90 is simply to maintain the annular passage 80 in full operative condition. Prior to the present invention, this passage would be progressively closed off at its upper end by expansion of the upper extremity of the valve. The present invention involves the discovery that it wasn't the expansion per se which rendered the sleeve valve inoperative but merely the resulting choking off of the annular passage 80, and the further discovery that when special passage means is provided in the valve by-passing just the upper choked-off portion of the passage 80, the valve and the tool embodying the same continues to operate perfectly and indefinitely regardless of the expansion of an upper zone of the valve into tight-fitting engagement with the bore 13.

In my issued Patent No. 2,922,626, an entirely different solution was offered for the basic problem above discussed. At the time the application for that patent was filed I considered that the expansion of the valve rendered the annular passage between the valve and the bore unavailable for use as the restricted liquid escape passage. The solution offered in that patent was to provide the valve with short escape passages connecting the high pressure liquid inside the valve with the low pressure liquid above the valve. These passages were entirely independent of the annular space between the valve and the bore in which it slides (here referred to as passage 80). The patent specifically shows short "bleeder orifices" 73 in the form of one or more shallow notches cut across the annular ground sealing face provided on the upper end of the valve, and the alternative of one or more short holes connecting the high pressure interior of the valve with the low pressure liquid above the valve.

These orifices are distinguished in said patent from the expansive annular intervalve-bore escape passage of the prior art by the term "small liquid escape passage means of compact cross-sectional area provided in said piston" (claim 5). Claim 7 of the patent expressly states, in defining the invention covered thereby, that the close fit between the valve and the bore *restricts* the by-passing of liquid past the valve to the flow of liquid through the special *orifice* means.

The term "annular peripheral passage" used herein and in the claims refers to the annular peripheral passage 80 between valve 63 and the bore 13 in which it slides. The term "relief passage means" refers to means such as those described, and their equivalents, for by-passing the restriction caused in the upper portion of the passage 80 by the expansion of the upper portion of valve 63.

Although shown in association with a hydraulic jar 10 and as particularly useful in association with such an oil well tool, it is to be noted that the inner mandrel section 41 of the present invention may be used in an oil well tool with equal advantage in which this section travels at all times in a bore of uniform diameter throughout the operation of the tool. In other words, this portion of the invention is not limited to a use thereof in a hydraulic jar having a bore 13 from which the section 41 travels into a counterbore 19. The same advantages as found in using this inner mandrel section of the jar 10 would likewise be realized in using such an inner mandrel section in oil well testing tools such as shown in the U.S. Letters Patent No. 2,703,696, issued March 8, 1955, to B. A. Deters et al. in which the hydraulic valve operates exclusively in a bore of uniform inside diameter.

Another particular advantage of the present invention is to be found in the fact that it is highly desirable to make tools such as those treated with in this application with a relatively large internal passage extending through the tool to allow as free flow of circulating liquid through the tool as possible and also afford a passage for instruments inserted downwardly through the drill string. To enlarge this internal passage it becomes necessary of course to use thinner walls for the hydraulic valve employed in the tool and the present invention offers a means whereby relatively thin-walled valves may be employed without the expansion of an end portion of the valve impeding the uniform operation of the latter in retarding the power stroke of the tool.

The claims are:
1. A sleeve valve adapted to be axially shiftable on the inner mandrel of an oil tool having telescopically related inner and outer mandrels confining a body of liquid therebetween, said inner mandrel having a stop at one end of the valve and an annular shoulder with a ground seat at the other end of said valve, said outer mandrel having a bore within which said valve slidably fits to effect a retarding action on telescopic movement between said mandrels in a direction which frictionally urges said valve against said ground seat, by limiting the flow of liquid past said valve to that which will flow through the annular peripheral passage between said valve and said bore, said sleeve valve comprising an annular sleeve having a ground face at one end thereof in a plane normal to the axis of said sleeve, said face being adapted to make a fluid-tight fit with said ground seat on said inner mandrel, the peripheral surface of said valve being adapted to make a loose sliding fit within said retarding bore of said tool to provide an annular peripheral liquid passage between said valve and said bore, relief passage means being provided in said valve leading from an interior area of said peripheral surface of said valve located a relatively short distance from the end of said valve having said ground face, said relief passage means communicating with a portion of said end of said valve disposed radially outwardly from the area thereof covered by contact between said face and said ground seat whereby liquid may readily escape from said peripheral passage through said relief passage means.

2. A sleeve valve as defined in claim 1 in which said relief passage means comprises groove means formed in said peripheral surface and extending from the ground face end of said valve to said interior area in said peripheral surface.

3. A sleeve valve as defined in claim 1 in which said relief passage means comprises an annular surface groove provided in said peripheral valve surface in spaced relation with opposite ends of said valve, and connecting passage means, formed in said valve, which connects with said annular groove and communicates with a portion of the end of said valve having said ground face, which is disposed radially outwardly from the area thereof covered by contact between said face and said ground seat.

4. A sleeve valve as defined in claim 3 in which said connecting passage means comprise surface groove means provided in said peripheral valve surface between said annular groove and said valve and having said ground face.

5. In an oil well tool, the combination of: inner and outer mandrels telescopically related, one of said mandrels connecting to the lower end of a drill string when said tool is in use, there being an annular hydraulic chamber provided between said mandrels for confining a body of operating liquid, a portion of which chamber is confined within a bore provided in the outer mandrel; two seal means for closing opposite ends of said chamber while allowing telescopic movement between the mandrels; a body of operating liquid confined in said chamber; an annular radial shoulder extedning into said chamber from said inner mandrel, said shoulder having an annular seat provided thereon; a valve stop on said inner mandrel spaced axially from said seat; and a cylindrical tubular hydraulic sleeve valve axially slidable a short distance on said inner mandrel between said seat and said stop, and having a ground face on the end toward said seat, an application of force axially in a given direction by said drill string to said one mandrel, with said valve in said bore, shifting said valve against said annular seat, closing said valve, trapping liquid in the part of said chamber at the stop end of said valve and transmitting said force to the other mandrel, there being a restricted peripheral passage for liquid between said bore and said valve through which liquid slowly by-passes said valve producing a slow, retarded telescopic motion between said mandrels, there being a much larger axial passageway for liquid between said valve and said inner mandrel which relatively freely connects the parts of said chamber disposed axially in opposite directions from said valve when a reverse telescopic motion between said mandrels, with said valve in said bore, hydraulically withdraws said valve from engagement with said valve seat, substantial hydraulic retardation of said reverse telescopic motion by said valve thus being prevented, relief passage means being provided in the external peripheral surface of said valve connecting with an interior area of the latter to allow the relatively free escape of liquid from said interior area to the part of said chamber at the end of said valve disposed toward said annular shoulder.

6. A combination as in claim 5 in which said relief passage means comprises surface groove means formed in the peripheral surface of said valve and extending from the ground face end of said valve to an interior area in said peripheral valve surface.

7. A combination as in claim 6 in which said relief passage means includes an annular external surface groove formed in and encircling said sleeve within said interior area and other peripheral surface groove means connecting said annular peripheral groove with said ground face end of said valve.

8. A combination as in claim 5 in which said bore has a counterbore into which said valve travels as it comes to the end of said bore adjacent said counterbore, and hammer and anvil shoulders provided respectively on said outer and inner mandrels which are brought into sudden, forceful contact by a continuation of relative movement between said mandrels, which causes said valve to pass into said counterbore, thereby striking a jarring blow against the mandrel not directly connected to said drill string.

9. In an oil well tool, the combination of: upper and lower tool subs, one of said subs being referred to as a primary sub and the other as a secondary sub; inner and outer mandrels telescopically related, one end of said outer mandrel being connected to said primary sub and one end of said inner mandrel being connected to said secondary sub, one of said subs being connected to a drill string when said tool is in use so that said tool is suspended on said drill string; an annular seal between said outer mandrel and said inner mandrel located at the same end of said outer mandrel which connects with said primary sub; a second annular seal between said outer mandrel and said inner mandrel located at the opposite end of said outer mandrel, said mandrels and said seals forming a hydraulic chamber for confining a body of operating liquid; a spline sub constituting an extension of said outer mandrel beyond said second annular seal, said spline sub slidably receiving said secondary sub; interengaging splines provided on said secondary sub and said spline sub to prevent relative rotation between said subs; and means provided on said inner mandrel for engaging said second annular seal for limiting the extension of said inner mandrel through said seal to retain said splines in interengagement.

References Cited in the file of this patent

UNITED STATES PATENTS

| | | |
|---|---|---|
| 2,059,540 | Stephan | Nov. 3, 1936 |
| 2,851,110 | Greer | Sept. 9, 1958 |
| 2,922,626 | Sutliff | Jan. 26, 1960 |

UNITED STATES PATENT OFFICE

CERTIFICATE OF CORRECTION

Patent No. 3,088,533　　　　　　　　　　　　　　　　May 7, 1963

Wayne N. Sutliff

It is hereby certified that error appears in the above numbered patent requiring correction and that the said Letters Patent should read as corrected below.

Column 8, line 34, for "hand" read -- band --; column 10, line 64, for "extedning" read -- extending --.

Signed and sealed this 31st day of December 1963.

(L)
st:
EST W. SWIDER ting Officer

EDWIN L. REYNOLDS

Acting Commissioner of Patents